(12) United States Patent
Gaines et al.

(10) Patent No.: US 9,942,184 B2
(45) Date of Patent: Apr. 10, 2018

(54) COMMUNICATION AND MANAGEMENT OF ELECTRONIC MAIL CLASSIFICATION INFORMATION

(71) Applicant: Bank of America Corporation, Charlotte, NC (US)

(72) Inventors: Brian J. Gaines, Greystones (IE); Holly E. Carney, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 625 days.

(21) Appl. No.: 14/041,198

(22) Filed: Sep. 30, 2013

(65) Prior Publication Data

US 2015/0095429 A1 Apr. 2, 2015

(51) Int. Cl.
*G06F 15/16* (2006.01)
*H04L 12/58* (2006.01)

(52) U.S. Cl.
CPC .............. *H04L 51/14* (2013.01); *H04L 51/02* (2013.01); *H04L 51/18* (2013.01)

(58) Field of Classification Search
CPC .......... H04L 67/02; H04L 67/06; H04L 67/36
USPC ........................................................ 709/206
See application file for complete search history.

(56) References Cited

U.S. PATENT DOCUMENTS

| | | | |
|---|---|---|---|
| 6,725,256 B1 * | 4/2004 | Albal | G06Q 10/107 370/234 |
| 7,774,408 B2 | 8/2010 | Sinha et al. | |
| 8,024,411 B2 * | 9/2011 | Pulfer | G06Q 10/107 707/769 |
| 8,428,367 B2 | 4/2013 | Ahmed | |
| 9,391,935 B1 * | 7/2016 | Gunda | H04L 51/08 |
| 2006/0085504 A1 | 4/2006 | Yang et al. | |
| 2008/0289037 A1 | 11/2008 | Marman et al. | |
| 2010/0332428 A1 | 12/2010 | McHenry et al. | |
| 2011/0026704 A1 * | 2/2011 | Connelly | H04L 63/102 379/219 |
| 2011/0154474 A1 | 6/2011 | Siegel et al. | |
| 2011/0270834 A1 * | 11/2011 | Sokolan | G06F 17/30707 707/737 |
| 2012/0078845 A1 | 3/2012 | Kasbekar et al. | |
| 2012/0216040 A1 | 8/2012 | Tanamy et al. | |
| 2013/0179516 A1 | 7/2013 | Tsai et al. | |
| 2014/0133696 A1 * | 5/2014 | Ilan | G06K 9/00536 382/101 |

(Continued)

FOREIGN PATENT DOCUMENTS

| | | |
|---|---|---|
| AU | 2011100527 | 5/2011 |
| JP | 2012190336 | 10/2012 |
| KR | 20050016779 | 2/2005 |

OTHER PUBLICATIONS

"User Driven Classification for Email," http://www.titus.com/software/message-classification/index.php, Titus Inc., 2013.

(Continued)

*Primary Examiner* — Yves Dalencourt
(74) *Attorney, Agent, or Firm* — Michael A. Springs

(57) ABSTRACT

A network interface receives an electronic mail on a first computer. A processor determines that the received electronic mail comprises a classification tag, and in response to the determination parses the classification tag to extract a plurality of classification information. The processor displays the plurality of classification information on the first computer.

16 Claims, 5 Drawing Sheets

(56) References Cited

U.S. PATENT DOCUMENTS

2014/0337448 A1* 11/2014 Kline .................. H04W 4/12
                                                                                            709/206

OTHER PUBLICATIONS

PCT Notification of Transmittal of the International Search Report and the Written Opinion of the International Searching Authority, or the Declaration with attached International Search Report and the Written Opinion of the International Searching Authority in International Application No. PCT/US14/42525 dated Oct. 20, 2014, 8 pages.

\* cited by examiner

COMMUNICATION AND MANAGEMENT OF ELECTRONIC MAIL CLASSIFICATION INFORMATION

TECHNICAL FIELD

This invention relates generally to communicating and managing electronic mail, and more particularly to communicating and managing electronic mail classification information.

BACKGROUND

Individuals typically transmit electronic mail ("e-mail") from an originating user to an end user over a network. E-mail has become a preferred way of communication among users in an organization for both internal and external communications. With the amount of e-mail between users continuing to increase, it becomes more difficult to manage the e-mails.

SUMMARY OF EXAMPLE EMBODIMENTS

According to embodiments of the present disclosure, disadvantages and problems associated with communicating and managing electronic mail classification information may be reduced or eliminated.

In accordance with a particular embodiment of the present disclosure, a network interface receives an electronic mail on a first computer. A processor determines that the received electronic mail comprises a classification tag, and in response to the determination parses the classification tag to extract a plurality of classification information. The processor displays the plurality of classification information on the first computer.

Certain embodiments of the present disclosure may provide one or more technical advantages. A technical advantage of one embodiment includes providing greater efficiencies in viewing, identifying, and managing electronic mails. As another example, a technical advantage of one embodiment includes improving the usability and readability of electronic mails. As yet another example, a technical advantage of one embodiment includes achieving greater efficiencies in computer resources and network usage.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Embodiments of the present invention and its advantages are best understood by referring to FIGS. 1-5, like numerals being used for like and corresponding parts of the various drawings.

Individuals typically transmit electronic mail ("e-mail") from an originating user to an end user over a network. E-mail has become a preferred way of communication among users in an organization for both internal and external communications. With the amount of e-mail between users continuing to increase, it becomes more difficult to manage the e-mails. An e-mail typically may include the following four components: a message header, a message subject, a message body, and attachments. The message header contains control information, including a recipient address and a message submission date/time stamp. The message subject contains a subject header field associated with the e-mail. The message body contains data communicated to the end user. The e-mail attachment is a computer file sent alongside the e-mail.

The teachings of this disclosure recognize that it would be desirable to provide a module that creates a classification tag associated with an e-mail such that a plurality of information (e.g., classification information, ownership, priority of e-mail) can be associated with the e-mail through the classification tag. The teachings of this disclosure also recognize that it would be desirable to allow users to change the plurality of information associated with the e-mail. Further, the teachings of this disclosure recognize that it would be desirable for a user to receive an e-mail and also retrieve the information associated with the e-mail. This leads to greater efficiencies in viewing, identifying, and managing e-mails. In addition, by allowing more information to be associated with an e-mail, the embodiments of the present disclosure may improve the usability and readability of e-mails, which leads to improvement in e-mail communication. Furthermore, organizations may achieve greater efficiencies in e-mail management because the e-mail classification may be standardized across an organization.

Figure 1:
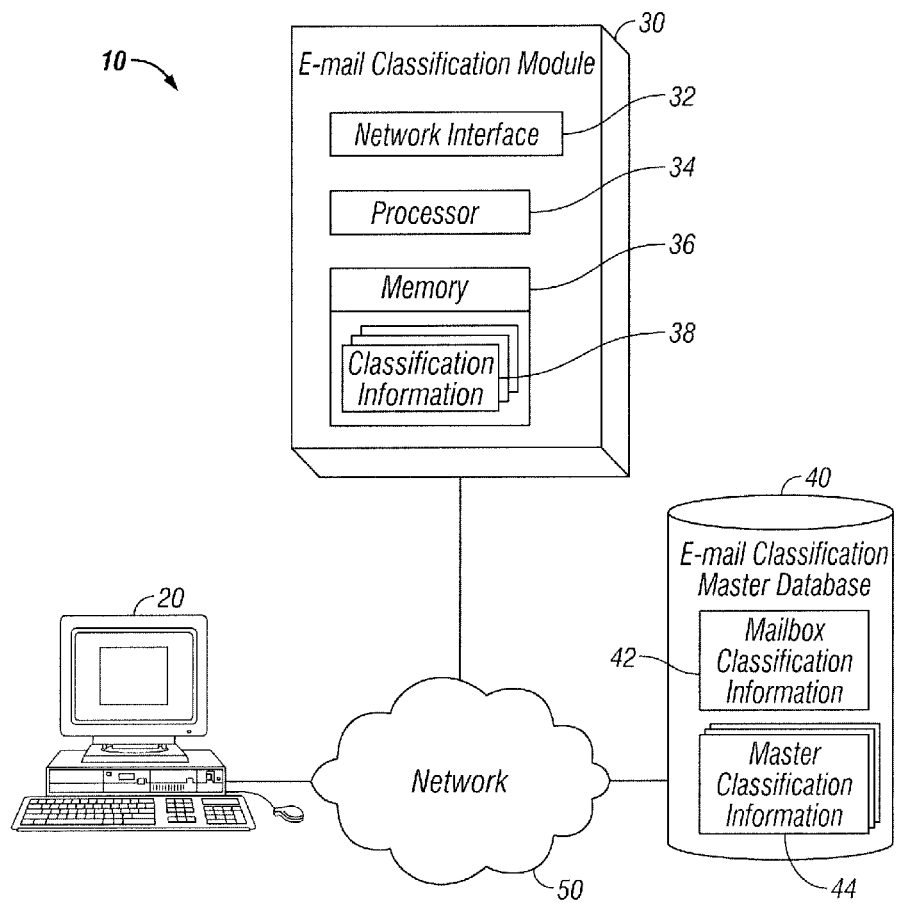
FIG. 1 illustrates a system for communicating and managing electronic mail classification information.

FIG. 1 illustrates a system for communicating and managing e-mail classification information. More specifically, system 10 includes computer system 20, e-mail classification module 30, and e-mail classification master database 40 that may be communicatively coupled by network 50. Generally, computer system 20, e-mail classification module 30, and e-mail classification master database 40 interact to efficiently communicate and manage classification information associated with e-mail.

Computer system 20 may be implemented using any suitable type of processing system and may include any suitable combination of hardware, firmware, and software. Computer system 20 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device capable of receiving, processing, storing, and/or communicating information with other components of system 10. Computer system 20 may be a stand-alone computer or may be a part of a larger network of computers associated with an entity.

Computer system 20 may include a display, which may include any suitable device operable to visually present information to a user. The display may present a graphical user interface ("GUI"), which may comprise a visual interface operable to allow a user to interface with computer system 20. Generally, the GUI provides the user with an efficient and user-friendly presentation of data provided by system 10, such as charts, tables and other information. The GUI may comprise a plurality of displays having interactive fields, pull-down lists, and buttons operated by the user. In one example, the GUI presents multiple charts and tables according to specification by the user and receives commands from the user. It should be understood that the term graphical user interface may be used in the singular or in the plural to describe one or more graphical user interfaces and each of the displays of a particular graphical user interface. Further, the GUI contemplates any graphical user interface, such as a generic web browser, that processes information in system 10 and efficiently presents the information to the user. Computer system 20 can accept data from the user via the web browser (e.g., MICROSOFT INTERNET EXPLORER, GOOGLE CHROME, or MOZILLA FIREFOX) and return the appropriate HTML or eXtensible Markup Language (XML) responses.

Computer system 20 may include an input device. The input device allows a user to interact with e-mail classification module 30 through computer system 20. The input device may comprise any user interface, such as a display, keyboard, mouse, or other appropriate terminal equipment.

Computer system 20 may interact with e-mail classification module 30 to display classification information 38 on computer system 20. For example, computer system 20 communicates with e-mail classification module 30 to display a visual representation of the classification information associated with an e-mail. A user may view and otherwise interact with the classification information using computer system 20.

System 10 includes e-mail classification module 30. E-mail classification module 30 represents any suitable components that communicates and manages the case number and classification information 38. E-mail classification module 30 may create and/or append a classification tag, which comprises case number 202 and classification information 38, to an e-mail. In certain embodiments, e-mail classification module 30 may store the case number and classification information 38 in e-mail classification master database 40 to have a single source of data collection for e-mails. This enables improved efficiencies in e-mail communication and e-mail data collection. E-mail classification module 30, which may contain network interface 32, processor 34, and memory 36 may be communicatively coupled by network 50 to other components within system 10.

E-mail classification module 30 may include a network service, any suitable remote service, a mainframe, a host computer, a workstation, a web server, a personal computer, a file server, or any other suitable device operable to communicate with computer system 20 and e-mail classification master database 40. In certain embodiments, e-mail classification module 30 may be a part of or distinct from computer system 20. In some embodiments, e-mail classification module 30 may execute any suitable operating system such as IBM's zSeries/Operating System (z/OS), MS-DOS, PC-DOS, MAC-OS, WINDOWS, UNIX, Open-VMS, or any other appropriate operating systems, including future operating systems. The functions of e-mail classification module 30 may be performed by any suitable combination of one or more servers or other components at one or more locations. In the embodiment where the modules are servers, the servers may be public or private servers, and each server may be a virtual or physical server. The server may include one or more servers at the same or at remote locations. Also, e-mail classification module 30 may include any suitable component that functions as a server.

System 10 may comprise one or more e-mail classification modules 30. In certain embodiments, e-mail classification module 30 may only be accessed by specified computer systems 20. Using this specified access, an enterprise may have multiple e-mail classification modules 30 with each module being accessible by a specified group of computer systems 20. Computer system 20 may belong to one or more e-mail classification modules 30. In certain embodiments, a single e-mail classification module 30 may be accessible by only a single computer system 20.

In certain embodiments, system 10 may contain two types of e-mail classification modules 30: a global e-mail classification module and a personalized e-mail classification module. The global e-mail classification module may be available to all members of system 10 and a personalized e-mail class module may be available only to a single user or group. A user and/or a group may be able to utilize both the global e-mail classification module and the personalized e-mail classification module to classify their e-mails. For example, User A may use the personalized e-mail classification module to classify e-mails according to his or her own classification with this classification being available only to User A, and User A may use the global e-mail classification to classify e-mails that will be available globally to all users within an enterprise. An e-mail may have multiple classifications. For example, an e-mail may have a classification for the personalized e-mail classification module and a classification for the global e-mail classification module.

In the illustrated embodiment, e-mail classification module 30 includes network interface 32, processor 34, and memory 36. Network interface 32 represents any suitable device operable to receive information from network 50, transmit information through network 50, perform suitable processing of the information, communicate to other devices, or any combination of the preceding. For example, network interface 32 transmits classification information 38 to computer system 20. Network interface 32 represents any port or connection, real or virtual, including any suitable hardware and/or software, including protocol conversion and data processing capabilities, to communicate through a LAN, WAN, or other communication system that allows e-mail classification module 30 to exchange information with network 50, computer system 20, and other components of system 10.

Processor 34 controls the operation and administration of e-mail classification module 30 by processing information received from network interface 32 and memory 36. Processor 34 communicatively couples to network interface 32 and memory 36. Processor 34 includes any hardware and/or software that operates to control and process information. For example, processor 34 controls the operation of e-mail classification module 30. Processor 34 may be a programmable logic device, a microcontroller, a microprocessor, any suitable processing device, or any suitable combination of the preceding.

Memory 36 represents a database that stores, either permanently or temporarily, received case number and classification information 38 from e-mail classification module 30. Memory 36 includes any one or a combination of volatile or non-volatile local or remote devices suitable for storing information. For example, memory 36 may include Random Access Memory ("RAM"), Read-only Memory ("ROM"), magnetic storage devices, optical storage devices, or any other suitable information storage device or a combination of these devices. Memory 36 may include any suitable information for use in the operation of e-mail classification module 30. Additionally, memory 36 may be a component external to e-mail classification module 30. Memory 36 can be located in e-mail classification module 30 or any other location suitable for memory 36 to communicate with e-mail classification module 30.

Classification information 38 is any type of classification information associated with the e-mail. In the illustrated embodiment, classification information 38 is stored in memory 36. Classification information 38 may consist of a single field of information or multiple fields of information. The fields may consist of an e-mail owner (e.g., the user that has control of the actions relating to the e-mail), an e-mail priority (e.g., the urgency of response or resolution to the e-mail), an e-mail status, a first level of classification, a second level of classification, or any other type of categorization that is associated with the e-mail. The first level of classification may be any type of classification that subdivides the e-mails among groups. For instance, the first level of classification may be a particular group in an organization, a particular topic that the e-mail relates to, or any type of classification that subdivides the e-mails into a set of groups. The second level of classification is similar to the first level of classification and may be any type of classification that subdivides the e-mail into a set of groups. The disclosure contemplates a myriad of levels of classification to further classify a particular email. Generally, classification information 38 is a subset of master classification information 44.

Within each classification information 38 is classifiers that identifies the particular classification of an e-mail in classification information 38. For example, priority classification may have three classifiers: "High Priority," "Medium Priority," and "Low Priority." A user may select one or more classifiers per classification information 38 to classify an e-mail. In certain embodiments, a user may set a default classifier for one or more fields in classification information 38. For example, the priority classification of an e-mail may have a default classifier of "Normal," until a user selects a classifier to classify the priority classification. Generally, the classifiers of classification information 38 are a subset of classifiers identified in master classification information 44.

E-mail classification master database 40 represents a database that stores, either permanently or temporarily, mailbox classification information 42 and master classification information 44. E-mail classification master database 40 includes any one or a combination of volatile or non-volatile local or remote devices suitable for storing information. For example, e-mail classification master database 40 may include RAM, ROM, magnetic storage devices, optical storage devices, or any other suitable information storage device or a combination of these devices. E-mail classification master database 40 may include any suitable information for use in the operation of e-mail classification module 30. Additionally, e-mail classification master database 40 may be included within e-mail classification module 30, rather than being a component external to e-mail classification module 30. E-mail classification master database 40 may also be located external to computer system 20. In certain embodiments, e-mail classification module 30 may be a part of or distinct from computer system 20.

In the illustrated embodiment, e-mail classification module 30 includes mailbox classification information 42 and master classification information 44. Mailbox classification information 42 is an association of the fields of master classification information 44 and classifiers for master classification information to a mailbox. An administrator may assign certain fields of master classification information 44 and/or certain classifiers of master classification information 44 to a particular mailbox. A user may be assigned access to one mailbox or multiple mailboxes to retrieve e-mails. A mailbox may include a personal mailbox, a shared mailbox (i.e., a mailbox shared by multiple users), or any type of e-mail repository that is accessible by one or more users. Mailbox classification information 42 can be located in e-mail classification master database 40 or any other location suitable for mailbox classification information 42 to be accessible by e-mail classification module 30.

Master classification information 44 is any type of classification information associated with the e-mail. Master classification information 44 may consist of a single field of information or multiple fields of information. The fields may consist of an e-mail owner (e.g., the user that has control of the actions relating to the e-mail), an e-mail priority (e.g., the urgency of response or resolution to the e-mail), an e-mail status, a first level of classification, a second level of classification, or any other type of categorization that is associated with the e-mail. The first level of classification may be any type of classification that subdivides the e-mails among groups. For instance, the first level of classification may be a particular group in an organization, a particular topic that the e-mail relates to, or any type of classification that subdivides the e-mails into a set of groups. The second level of classification is similar to the first level of classification and may be any type of classification that subdivides the e-mail into a set of groups. The disclosure contemplates a myriad of levels of classification to further classify a particular email. Generally, master classification information 44 comprises a list of one or more classification information that can be associated with an e-mail. Master classification information 44 can be located in e-mail classification master database 40 or any other location suitable for master classification information 44 to be accessible by e-mail classification module 30.

Within each master classification information 44 is classifiers that identify the particular classification of an e-mail. For example, priority classification may have three classifiers: "High Priority," "Medium Priority," and "Low Priority." The classifiers of master classification information 44 comprise a list of one or more classifiers that can be associated with an e-mail for a particular field of master classification information 44.

Network 50 facilitates communications between computer system 20, e-mail classification module 30, e-mail classification master database 40, and any other components in system 10. This disclosure contemplates any suitable network 50 operable to facilitate communication between the components of system 10. Network 50 may include any interconnecting system capable of transmitting audio, video, signals, data, messages, or any combination of the preceding. Network 50 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of network 50.

To facilitate administration of e-mail classification module 30 and e-mail classification master database 40, an administrator assigns classifiers and fields from master classification information 44 to each mailbox for users to categorize their e-mails in that particular mailbox. The administrator may be any user of system 10. E-mail classification master database 40 may be designed such that only a select number of users are granted administrative rights to make changes to e-mail classification master database 40.

The fields may consist of an e-mail owner (e.g., the user that has control of the actions relating to the e-mail), an e-mail priority (e.g., the urgency of response or resolution to the e-mail), an e-mail status (e.g., the current standing or action of the e-mail), a first level of classification, a second level of classification, or any other type of categorization to further classify the particular e-mail. In certain embodiments, the first level of classification routes the e-mail to a particular subset of users based on the classification and the second level of classification routes the e-mail from that particular subset of users to a particular group of users. The disclosure contemplates an assortment of fields that may be included in classification information 38. Other examples of fields that may be included in classification information 38 include original sender information, number of times the e-mail was classified—which can be further subdivided into the number of times the e-mail was classified by particular users, response times to e-mail, resolution time for the e-mail, counts of e-mails, or any other fields that can be used to categorize or be used as a reporting metric for the e-mails. Certain fields, such as response time to a received e-mail or resolution time for the e-mail, may be calculated using other associated information or classification information field pertaining to the e-mail. For example, response time may indicate a time period of when the e-mail was received when a response e-mail was sent. Another example may be the resolution time, which may indicate a time period of when the e-mail was classified with a status as "Needs Resolution" and changed to a "Resolved" status.

The administrator may assign classifiers from master classification information 44 for each assigned field for classification information 38. This may aid in the standardization and consistency of the fields across an enterprise. For instance, a priority field may have only three classifiers in master classification information 44: "High Priority," "Medium Priority," and "Low Priority." An administrator may assign only classifiers "High Priority" and "Low Priority" to Mailbox A. The assigned classifiers may be modified, added, or deleted by the administrator.

In an example embodiment, an administrator may assign certain fields and classifiers of master classification information 44 to mailbox classification information 42. For example, master classification information 44 may contain Owner and Priority fields. The Owner field may contain classifiers User1, User2, and User3, or may be unrestricted. The Priority field may contain classifiers "High Priority," "Medium Priority," and "Low Priority." An administrator may assign classification information Owner and Priority fields to Mailbox A. Further, administrator may allow the Owner field to contain only classifier User1 and allow the Priority field to contain only classifiers "High Priority" and "Low Priority" for Mailbox A. For Mailbox B, administrator may assign only the Owner field to Mailbox B and may allow Mailbox B to select only classifiers User2 and User3 for the Owner field. Generally, classification information and classifiers of classification information associated with a mailbox in mailbox classification information 42 will be a subset of master classification information 44 and classifiers of master classification information 44.

The administrator may also set access to mailbox classification information 42 and master classification information 44 such that a select group of users may access and manipulate the information contained in mailbox classification information 42 and master classification information 44. For example, the administrator may allow users belonging to a "Management Group" to only access and modify the master classification information 44. In addition, the administrator may allow users belonging to a "Mailbox Management Group" to only access and modify mailbox classification information 42. In certain embodiments, an administrator may assign access to certain users to modify mailbox classification information 42 for certain mailboxes. For example, User A may only modify the classification information assigned to Mailbox A and User B may only modify the classification information assigned to Mailbox B.

In an exemplary embodiment of operation, a user interacts through computer system 20 with e-mail classification module 30 while sending, receiving, viewing, and organizing e-mails in a particular mailbox. A user may consist of one or more users. For example, multiple individuals may access a shared e-mail system. E-mail classification module 30 may run in the background of computer system 20 or may be a selectable process that a user runs. E-mail classification module 30 may communicate with e-mail classification master database 40 to identify classification information associated with the particular mailbox using mailbox classification information 42. In an exemplary embodiment, e-mail classification module 30 replicates the classification information and classification information classifiers for the particular mailbox to classification information 38.

In one embodiment, a user may create a new outbound e-mail. The user may access e-mail classification module 30 to provide classification information 38 to the new outbound e-mail. The user may input entries for each field of classification information 38 using computer system 20. The user may input entries for all, some, or none of the fields of classification information 38. E-mail classification module 30 may create a new case number if a user classifies an outbound e-mail. Alternatively, the outbound e-mail may be associated with a previous e-mail if the outbound e-mail is a reply or forward to a received e-mail or a user may indicate that the outbound e-mail is associated with a previous e-mail. If the outbound e-mail is associated with a previous e-mail, e-mail classification module 30 appends the associated e-mail's classification tag to the outbound e-mail.

As mentioned above, in certain embodiments, the user can classify an outbound e-mail. E-mail classification module 30 may request the user to classify the e-mail before sending. If the user chooses to classify the e-mail, the user may input entries for each field of classification information 38 using computer system 20. In certain embodiments, e-mail classification module 30 analyzes the e-mail to suggest entries in the classification. This may include the e-mail classification module 30 analyzing the subject, date, time sent or received, body text, attachments, or other classification information to determine suggested entries for fields in classification information 38. Using the inputted entries, the time of the classification, and the user classifying the email, e-mail classification module 30 may create and append a new classification tag for the outbound e-mail.

The classification tag may be a character string separated by a divider that indicates a case number and fields of classification information 38. The case number and individual fields of classification information 38 may be arranged consecutively such that e-mail classification module 30 will identify the text pertaining to case number 44 and text pertaining to the fields of classification information 38 by the layout of the text in the classification tag. An example classification tag is described below with reference to FIG. 2.

In certain embodiments, e-mail classification module 30 communicates classification information 38 associated with the outbound e-mail through the classification tag. In alternative embodiments, e-mail classification module 30 may update e-mail classification master database 40 with the new classification tag. In certain embodiments, if the user deletes the outbound e-mail before sending it, e-mail classification module 30 will remove the new classification tag associated with the outbound e-mail from e-mail classification master database 40.

The e-mail classification module 30 may use the case number and some, none, or all of the fields in classification information 38 to create the classification tag. The classification tag will then be appended to the outbound e-mail. Some or all of the fields in classification information 38 may be encrypted before creating the classification tag. For example, e-mail classification module 30 may use the login name of the owner of the e-mail in the classification tag. E-mail classification module 30 may encrypt the owner's login name before using it to create the classification tag. The encryption may be any type of encoding such that the information is not easily readable without decryption. Examples of encryption include public key cryptography or private key cryptography. E-mail classification module 30 may apply a decryption technique to extract the encrypted fields of classification information from the classification tag. E-mail classification module 30 may append the classification tag to the subject line of the e-mail, to the body of the e-mail, as an attachment to the e-mail, or append the classification tag to any portion of the e-mail such that the classification tag is communicated with the e-mail.

In another exemplary embodiment of operation, a user may receive an e-mail that contains a classification tag. E-mail classification module 30 first determines whether the received e-mail contains a classification tag. This determination may be made by scanning the subject line of the received e-mail for a classification tag, scanning the body line for a classification tag, viewing attachments that may contain the classification tag, or any other method to determine a classification tag associated with the received e-mail. In certain embodiments, the classification tag may be identified by a unique string of characters or a certain file name associated with the received e-mail.

If the e-mail contains a classification tag, e-mail classification module 30 parses the classification tag to extract the case number and classification information 38. In certain embodiments, e-mail classification module 30 will extract all of the fields of the e-mail's classification information 38 through the classification tag. In alternative embodiments, e-mail classification module 30 will access e-mail classification master database 40 to retrieve some or all of the fields of classification information 38 that are not contained in the received e-mail's classification tag.

E-mail classification module 30 may display the classification information on computer system 20. E-mail classification module 30 may display some, none, or all of the fields of classification information 38 on computer system 20. E-mail classification module 30 may display an e-mail in a different format based on classification information 38. For example, if the priority classification information of an e-mail was set to "High Priority," the subject line of the e-mail may be converted to a red color. A particular example of a display of an e-mail's classification information is described below with reference to FIG. 3.

In certain embodiments, e-mail classification module 30 identifies and parses the classification tag after receiving a request from computer system 20 to classify the e-mails. E-mail classification module 30 may identify the classification tag for each e-mail in the e-mail repository and update the classification information displayed for each e-mail. In certain embodiments, e-mail classification module 30 identifies e-mails in the e-mail repository that has a changed classification tag from the previous request to classify e-mails, and determines the new classification information for those e-mails.

In particular embodiments, the user may receive an e-mail that does not contain a classification tag. E-mail classification module 30 may then request user to classify the e-mail. In certain embodiments, e-mail classification module 30 will analyze previous e-mails in e-mail classification master database 40 to find an e-mail thread associated with the received e-mail. E-mail classification module 30 may find associated e-mail threads by finding similar subject lines of an e-mail or identifying body text of the e-mails that are similar to each other. If e-mail classification module 30 determines that there are associated e-mails with the received e-mail, e-mail classification module 30 may duplicate the classification tag of the associated e-mail and append the classification tag to the received e-mail.

In another exemplary embodiment of operation, a user may change classification information 38 associated with a previously-classified e-mail using computer system 20. A user may input entries for one, some, or all of the fields of classification information 38 using computer system 20. E-mail classification module 30 creates a new classification tag using the updated classification information, time of classification, and classifier. E-mail classification module 30 replaces the previous classification tag appended to the previously-classified e-mail with the new classification tag.

In certain embodiments, the previously-classified e-mail is associated with other e-mails. E-mail classification module 30 may update each associated e-mail with the new classification tag or may only update the previously-classified e-mail. In other embodiments, e-mail classification module 30 appends the new classification tag to the previously-classified e-mail without replacing the previous classification tag. E-mail classification module 30 may use the placement of the classification tag to determine the latest classification tag, while keeping a history of the classifications of the e-mail.

In alternative embodiments, e-mail classification module 30 may update classification information 38 in e-mail classification master database 40 using the case number of the e-mail to reflect the user-inputted change to classification information 38.

In certain embodiments, an administrator or user may assign actionable events that are executed according to a classification of an e-mail. An actionable event may be any programmed action that occurs after a rule is met. For example, an actionable event may be moving an e-mail to a particular folder, creating a response e-mail to the classified e-mail, re-directing the e-mail to a different e-mail address, or any other actionable event that occurs based on classification information 38 of a particular e-mail. A user or administrator may create rules to execute the actionable event. An example rule may be if an e-mail is classified as "High Priority," the subject line of the e-mail may be converted to a red color. As another example, e-mail classification module 30 may interact with an e-mail repository application (e.g., MICROSOFT OUTLOOK, MOZILLA THUNDERBIRD, APPLE MAIL, etc.) to automatically sort e-mails based on classification information 38. E-mail classification module 30 may also place an e-mail in a new folder or in an existing folder in an e-mail repository application based on its classification information 38. A rule may be any logical operators of classification information 38 of one or more e-mails that executes an actionable event.

Modifications, additions, or omissions may be made to system 10 without departing from the scope of the invention. For example, system 10 may include any number of computer systems 20, e-mail classification modules 30, and e-mail classification management databases 40. Furthermore, the components of system 10 may be integrated or separated. For example, computer system 20 and e-mail classification module 30 may be incorporated into a single component. As another example, e-mail classification module 30 and e-mail classification master database 40 may apply to any form of electronic communication. For example, e-mail classification module 30 and e-mail classification master database 40 may assist in creating classification information for phone conversations, text messages, web chat, and voicemail mailboxes.

Figure 2:
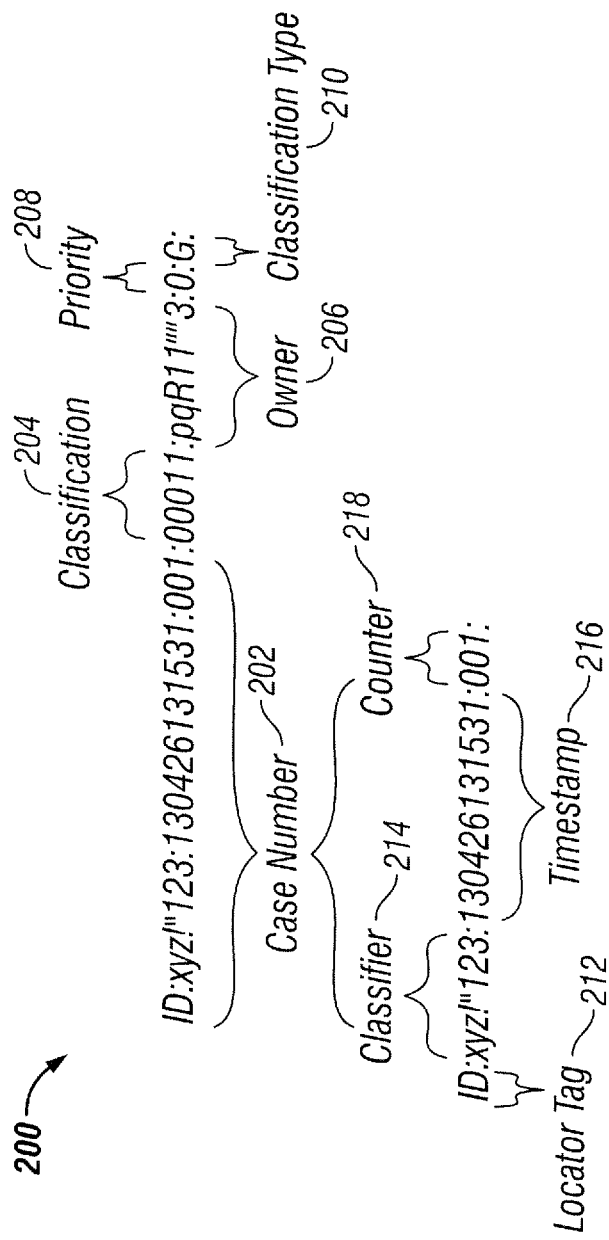
FIG. 2 illustrates an example classification tag.

FIG. 2 illustrates an example classification tag 200. Classification tag 200 may be generated by e-mail classification module 30. In the illustrated embodiment, classification tag includes case number 202, classification 204, owner 206, priority 208, and classification type 210. Case number 202 may also include classifier 214, timestamp 216, and counter 218.

Classification tag 200 is a character string separated by dividers that indicate case number 202 and fields of classification information 38. In the illustrated embodiment, the fields of classification information 38 include classification 204, owner 206, priority 208, and classification type 210. Classification tag 200 is appended to an e-mail such that the information in classification tag 200 (i.e., the case number and classification information) is passed along with the e-mail. Classification tag 200 may be any type of indication, such as a text, an image, or any other type of indicator. In certain embodiments, classification tag 200 identifies e-mails that are associated with one another. For example, classification tag 200 may be appended to all associated e-mails. E-mails may be associated if the e-mails are linked in an e-mail thread (i.e., a list of all replies and forwards pertaining to an original e-mail) or users may have the ability to link e-mails together. In certain embodiments, a change in classification tag 200 may change classification tag 200 for associated e-mails. In alternative embodiments, each e-mail may contain a unique classification tag 200.

In certain embodiments, e-mail classification module 30 parses classification tag 200 to ascertain the values of each individual field of classification information 38. In exemplary embodiments, classification tag 200 will include classification information for all fields of classification information 38 displayed on computer system 20. The value of the individual field of classification information 38 in classification tag 200 may correspond to the name of the classifier for classification information 38 to display on computer system 20. For example, "0" in the field priority 208 may correspond to a priority of "Low Priority" in e-mail classification module 30. As another example, "00011" in classification 204 may correspond to a first level of classification of "Management" and a second level of classification of "Customer E-mail" in e-mail classification module 30. The association between the value in classification information 38 and its corresponding classifier name may be standard across each mailbox by classification information 38 being a subset of classification information located in master classification information 44.

Classification tag 200 may be parsed into its separate elements. In the illustrated embodiment, the classification tag includes case number 202, classification 204, owner 206, priority 208, and classification type 210.

Case number 202 is a unique character string that is assigned to one or more e-mails by e-mail classification module 30. Case number 202 may comprise locator tag 212, classifier 214, timestamp 216, and counter 218. Case number 202 may be used by e-mail classification module 30 to ascertain classification information 38 from e-mail classification master database 40 that is not contained in classification tag 200.

In the illustrated embodiment, the fields of classification information 38 include classification 204, owner 206, priority 208, and classification type 210. Classification 204 is an identification of a classification associated with the e-mail. The classification can be any type of classification that subdivides the e-mails into groups of e-mails. For instance, the first level of classification can be a particular group in an organization, a particular topic that the e-mail relates to, or any type of classification that subdivides the e-mails into a set of groups. Classification 204 may indicate multiple levels of classification to subdivide and/or identify the e-mail.

Owner 206 may correspond to the login of the owner of the e-mail. The owner of the e-mail may correspond to a user that has control of the actions relating to the e-mail, a user that is requested to respond to the e-mail, a user that received the e-mail, or any other indication of a user or group of users that are associated with the e-mail. The login of the user can be encrypted such that the login name is not sent as plaintext in classification tag 200. The encryption may be any type of encoding such that the user login is not easily readable without decryption. Examples of encryption include public key cryptography or private key cryptography. For instance, the owner 206 may appear as a string of characters. E-mail classification module 30 may apply a decryption technique to extract the user login from owner 206.

Priority 208 may indicate the urgency of response or resolution to the e-mail. For example, priority 208 may indicate "1," which e-mail classification module 30 may identify as corresponding to "High Priority." Priority 208 may be any value or character that corresponds to a stage or rank of the e-mail. In certain embodiments, e-mail classification module 30 may determine a priority from classification information 38 associated with the e-mail. For example, e-mail classification module 30 may contain a list of priority e-mail users such that whenever an e-mail is received from an e-mail user in the list of priority e-mail users, e-mail classification module 30 may identify the priority as "High Priority."

Classification type 210 may indicate the e-mail classification module 30 and/or e-mail classification master database 40 that classification tag 200 corresponds to. For example, the e-mail may have multiple classification tags 200 appended to the e-mail with each classification tag 200 corresponding to a particular e-mail classification module 30 and/or e-mail classification master database 40. Classification type 210 may distinguish the e-mail classification module 30 and/or e-mail classification management database 40 that the classification tag 200 corresponds to. For instance, if there are two e-mail classification modules 30, a global classification module and a personalized classification module, classification type 210 may indicate a letter 'G' for classification tag 200 that corresponds to the global classification module and a letter 'P' for classification tag 200 that corresponds to the personalized classification module.

Locator tag 212 is a character string that identifies the list of characters as classification tag 200. In certain embodiments, e-mail classification module 30 scans an e-mail to locate locator tag 212. Once locator tag 212 is identified, e-mail classification module 30 may then be able to identify and parse classification tag 200.

Classifier 214 may indicate the login of a user that classified the e-mail, the login of the user that last classified the e-mail, or the login of the user that first classified the e-mail. The login of the user can be encrypted such that the login name is not sent as plaintext in classification tag 200. The encryption may be any type of encoding such that the user login is not easily readable without decryption. Examples of encryption include public key cryptography or private key cryptography. For instance, classifier 214 may appear as a string of characters. E-mail classification module 30 may apply a decryption technique to extract the user login from classifier 214.

Timestamp 216 may indicate the time that the e-mail was classified, the time that the e-mail was sent, the time that the e-mail was created, or any time frame relating to the e-mail. Timestamp 216 may be in the format of YYYYMMDDhhmmss, wherein Y indicates the years, M indicates the numerical month, D indicates the date, h indicates the hour, m indicates the minute, and s indicates the second. Timestamp 216 may be in any format such that timestamp 216 indicates a time associated with the e-mail.

Counter 218 may indicate the number of e-mails classified in the same second, the count of e-mails associated with classifier 214 and timestamp 216, timestamp 216 in a millisecond format, or any value such that it ensures case number 202 is a unique character string.

Modifications, additions, or omissions may be made to classification tag 200 without departing from the scope of the invention. For example, a single portion of classification tag 200 may correspond to multiple fields of classification information 38.

Figure 3:
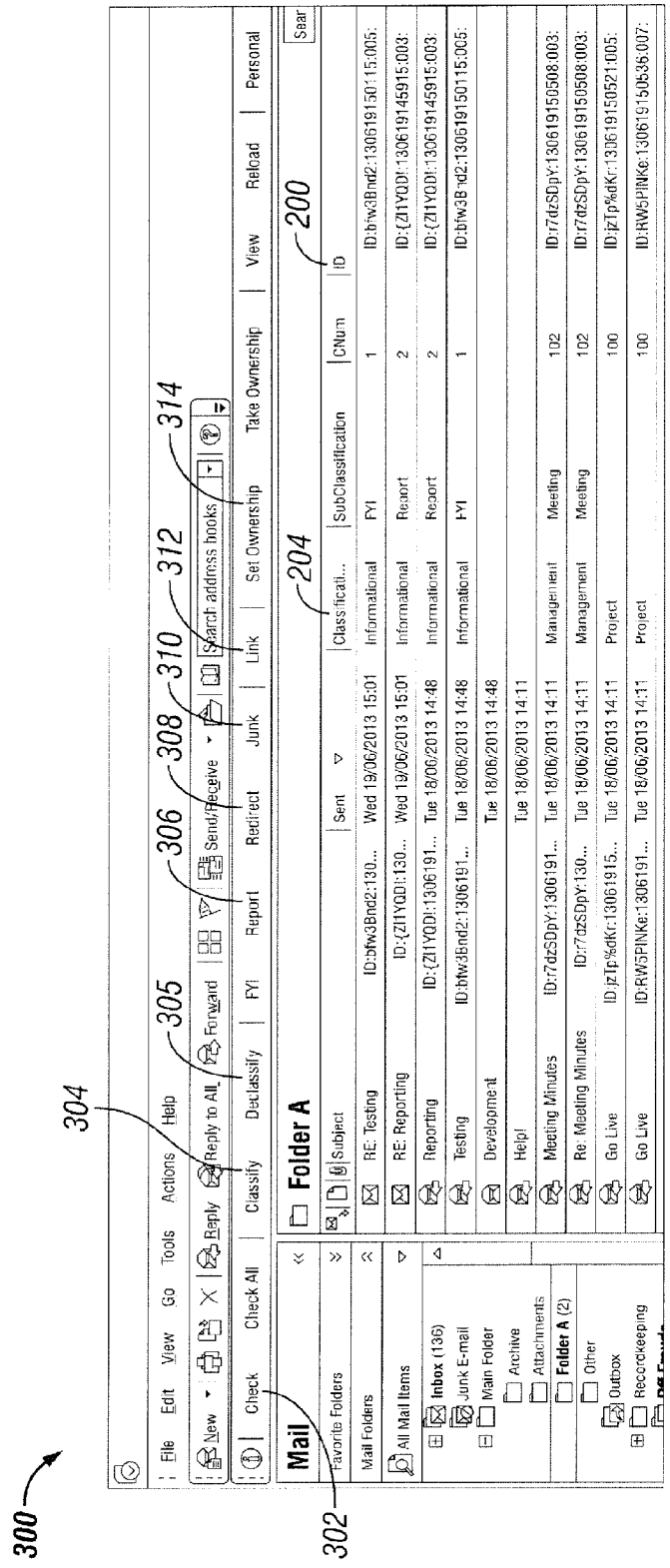
FIG. 3 illustrates a screenshot displaying the classification information associated with an e-mail.

FIG. 3 illustrates a screenshot 300 displaying classification information 38 associated with an e-mail. In the illustrated embodiment, screenshot 300 includes classification tag 200, classification 204, check button 302, classify button 304, declassify button 305, report button 306, redirect button 308, junk button 310, link button 312, and set ownership button 314.

Selecting check button 302 may update and/or verify classification information 38 associated with the highlighted e-mail using classification tag 200 appended to the e-mail. If e-mail classification module 30 determines that classification tag 200 changed since the last check, e-mail classification module may also change the classification tag 200 for each associated e-mail.

Selecting classify button 304 adds or changes the classification information associated with the e-mail. A user may add classification information 38 if the e-mail has not been previously classified. If an e-mail has been previously classified, a user may update the entries in the fields of the classification information 38 associated with the e-mail. If a user changes the classification information, e-mail classification module may also change the classification tag 200 for each associated e-mail.

Selecting declassify button 305 removes the classification information 38 associated with the e-mail. E-mail classification module 30 also removes classification tag 200 from the e-mail. In certain embodiments, e-mail classification module 30 may remove the classification information 38 from all associated e-mails as well. A user may remove classification information 38 for one e-mail, for a particular set of e-mails, or for all associated e-mails by selecting declassify button 305.

Selecting report button 306 may allow a user to create an e-mail report. A user must first select the requested classification information. Requested classification information is a particular entry or entries for specific fields in classification information 38. In certain embodiments, e-mail classification module 30 may access e-mail classification master database 40 to retrieve e-mails with the requested classification information. E-mail classification module 30 may generate an e-mail report by reporting the relevant e-mails, relevant e-mails being e-mails with the requested classification information. For example, a user may request all e-mails that are classified with a priority of "High Priority." In this scenario, e-mail classification module 30 may retrieve all e-mails with a priority of "High Priority." E-mail classification module 30 may then generate the electronic mail report to include all e-mails with a priority of "High Priority." In certain embodiments, a user may select a plurality of mailboxes to generate an e-mail report. E-mail classification module 30 may then access each selected mailbox's classification information 38 to generate the e-mail report. In an alternative embodiment, e-mail classification module 30 may extract classification information 38 from e-mails and store the extracted classification information in memory 36 for reporting purposes. E-mail classification module 30 may create a report based on any classification information associated with the e-mail.

In an alternative embodiment, selecting report button 306 allows a user to classify an e-mail as a report. E-mail classification module 30 may identify the e-mail and associated e-mails as a report. In certain embodiments, classification module 30 may automatically move the e-mails to a particular folder. Although referenced as selecting report button 306, buttons may be created and implemented such that a user may automatically categorize an e-mail for one or more fields of classification information 38 associated with the e-mail by clicking on that button.

Selecting redirect button 308 allows a user to redirect an e-mail to a particular user or group. Re-directing an e-mail may include forwarding an e-mail to a particular address, moving an e-mail from one mailbox to another mailbox, duplicating an e-mail to a separate mailbox, or any form of transporting a version of the e-mail to a separate mailbox. A group may be one user or a collection of users. The field may be pre-populated such that a user may only need to select a group without identifying an e-mail address or a particular individual in the group. Classification information 38 of the e-mail may be updated to indicate that the e-mail was redirected. In addition, e-mail classification module 30 may create an e-mail to notify the sender of the e-mail of the re-directed address. In certain embodiments, a computer may analyze an e-mail or past history of redirecting e-mails to suggest a group or a myriad of groups to redirect the e-mail towards. E-mail classification module 30 may also identify associated e-mails and redirect the associated e-mails to the new group.

Selecting junk button 310 allows a user to classify an e-mail as junk. E-mail classification module 30 may identify the e-mail and associated e-mails as junk. In certain embodiments, classification module 30 may automatically move the e-mails to a particular folder or delete the e-mail.

Selecting link button 312 allows a user to link e-mails. Linking e-mails allows two e-mails to be associated with each other. E-mail classification module 30 may link an e-mail by assigning a similar classifier tag 200 to both e-mails. A user may link two or more e-mails together.

Selecting set ownership button 314 allows a user to set an owner of an e-mail. In certain embodiments, after setting ownership of an e-mail to a user, e-mail classification module 30 may notify the newly-selected user of the ownership of the e-mail.

Modifications, additions, or omissions may be made to screenshot 300 without departing from the scope of the invention.

Figure 4:
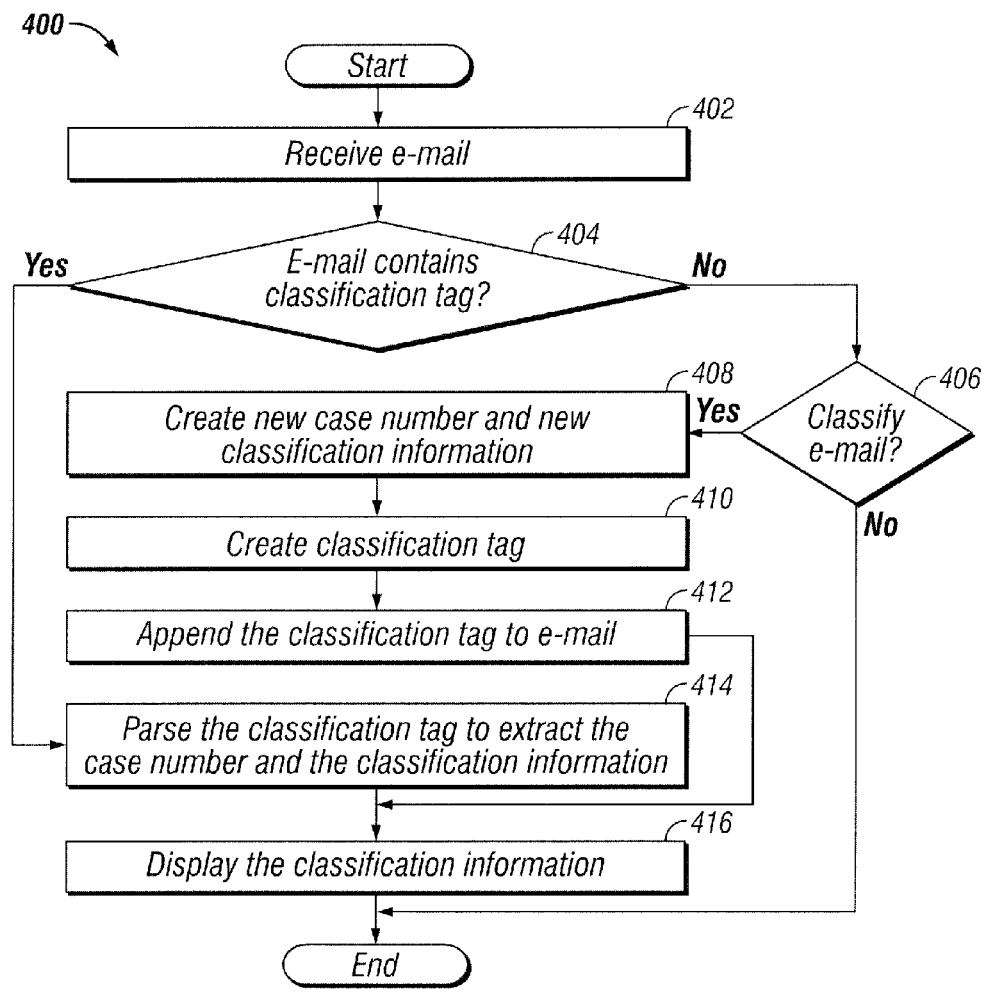
FIG. 4 illustrates an example method for retrieving and displaying the classification information from a received e-mail.

FIG. 4 illustrates an example method for retrieving and displaying classification information from a received e-mail. The method begins at step 402 when e-mail classification module 30 receives an e-mail from computer system 20. In certain embodiments, e-mail classification module 30 begins the method when a user initiates a classification of one or more e-mails. At step 404, e-mail classification module 30 determines if the e-mail contains classification tag 200. E-mail identification module 30 may make this determination by locating locator tag 212 in the e-mail.

If the e-mail does not contain classification tag 200, the method proceeds to step 406. At step 406, e-mail classification module 30 may request the user to classify the e-mail. If the user chooses to classify the e-mail, the user may input entries for each field of classification information 38 using computer system 20 and the method proceeds to step 408. In certain embodiments, e-mail classification module 30 analyzes the e-mail to suggest entries in the classification. This may include the e-mail classification application analyzing the subject, date, time sent or received, body text, attachments, or other classification information to determine suggested entries for fields in classification information 38. Classification information 38 may be initiated as a null value or any other default value.

E-mail classification module 30 creates new case number 202 and classification information 38 at step 408. New case number 202 may be created using a combination of the time the change in classification information was made and the user that inputted the classification. The new classification information may be created from the values input in classification information 38 from the user.

At step 410, e-mail classification module 30 creates classification tag 200 using case number 202 and classification information 38. In certain embodiments, some, all, or none of the fields of classification information 38 are used to create classification tag 200. At step 412, classification tag 200 is appended to the e-mail. In certain embodiments, e-mail classification module 30 updates e-mail classification master database 40 with new case number 202 and classification information 38.

If the e-mail contains classification tag 200, the method proceeds to step 414, and e-mail classification module 30 parses classification tag 200 to extract case number 202 and classification information 38. Classification information 38 may contain multiple fields of classification information 38 (e.g., classification 204, owner 206, priority 208, etc.). In certain embodiments, e-mail classification module 30 may access e-mail classification master database 40 to retrieve additional fields of classification information 38 associated with case number 202.

At step 416, e-mail classification module 30 displays classification information 38 associated with the received e-mail on computer system 20. A user may then be able to modify or delete entries in classification information 38 using computer system 20.

Modifications, additions, or omissions may be made to the method depicted in FIG. 4. The method may include more, fewer, or other steps. For example, e-mail classification module 30 may parse extracted case number 202 to extract classifier 214, timestamp 216, and counter 218. As another example, e-mail classification module 30 may display only certain subsets of classification information 38 on computer system 20. While discussed as e-mail classification module 30 performing the steps, any suitable component of system 10 may perform one or more steps of the method.

Figure 5:
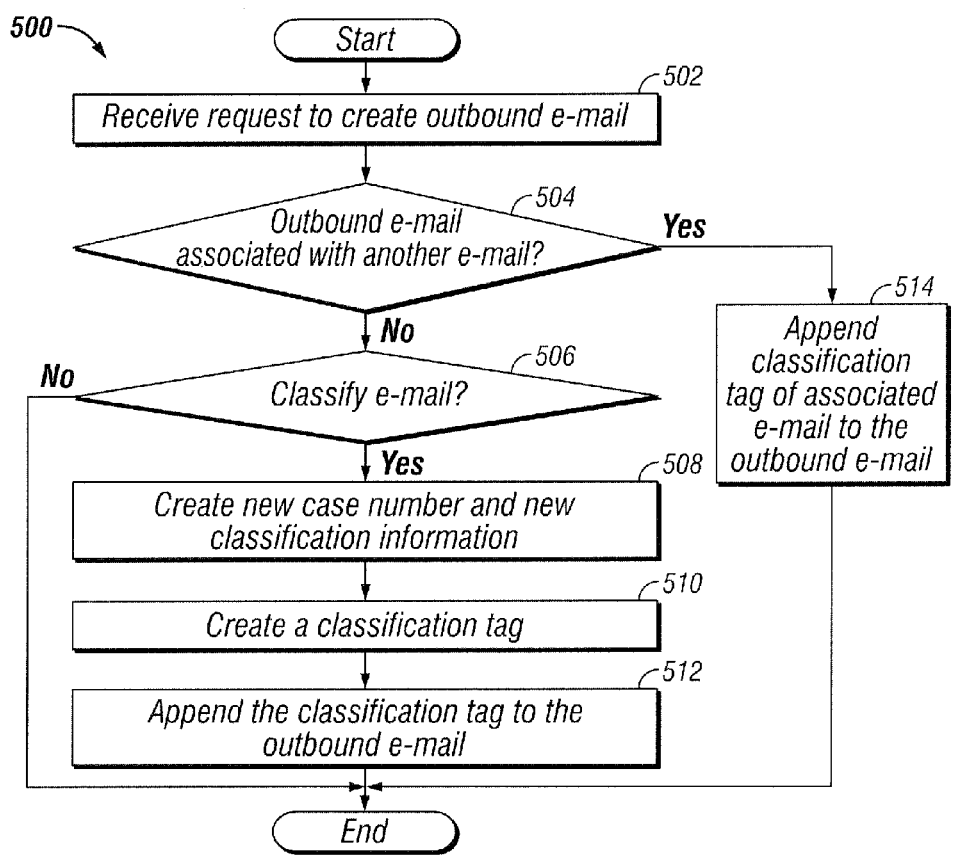
FIG. 5 illustrates an example method for generating and appending the classification tag to an outbound e-mail.

FIG. 5 illustrates an example method for generating and appending classification tag 200 to an outbound e-mail. The method begins at step 502, wherein e-mail classification module 30 receives a request from computer system 20 to create an outbound e-mail. At step 504, e-mail classification module 30 determines whether the outbound e-mail is associated with a previously received e-mail. An outbound e-mail may be associated with a previously received e-mail if the outbound e-mail is a reply or forward to the previous e-mail. In certain embodiments, a user has the ability to specify that the outbound e-mail be linked to a previously classified e-mail.

If the outbound e-mail is not associated with a received e-mail, the method proceeds to step 506, wherein e-mail classification module 30 may request the user to classify the e-mail before sending. If the user chooses to classify the e-mail, the user may input entries for each field of classification information 38 using computer system 20 and the method proceeds to step 508. In certain embodiments, e-mail classification module 30 analyzes the e-mail to suggest entries in the classification. This may include the e-mail classification application analyzing the subject, date, time sent or received, body text, attachments, or other classification information to determine suggested entries for fields in classification information 38. Classification information 38 may be initiated as a null value or any other default value.

E-mail classification module 30 creates new case number 202 and classification information 38 at step 508. New case number 202 may be created using a combination of the time the change in classification information was made and the user that inputted the classification. The new classification information may be created from the values input in classification information 38 from the user.

At step 510, e-mail classification module 30 creates classification tag 200 using case number 202 and classification information 38. In certain embodiments, some, all, or none of the fields of classification information 38 are used to create classification tag 200. At step 512, classification tag 200 is appended to the e-mail. In certain embodiments, e-mail classification module 30 updates e-mail classification master database 40 with new case number 202 and classification information 38.

At step 512, e-mail classification module 30 creates classification tag 200 to append to the new outbound email. The e-mail classification application may use case number 202 and some, none, or all of the fields in classification information 38 to create classification tag 200. Classification tag 200 will then be appended to the outbound e-mail. Some or all of the fields in classification information 38 may be encrypted before placing in classification tag 200. E-mail classification module 30 may append classification tag 200 to the subject line of the e-mail, to the body of the e-mail, as an attachment to the e-mail, or append classification tag 200 to any portion of the e-mail such that classification tag 200 is communicated alongside the e-mail. In certain embodiments, e-mail classification module 30 updates e-mail classification master database 40 with the newly-created classification tag.

If the outbound e-mail is associated with a received e-mail, the method proceeds to step 514, wherein e-mail classification module 30 appends classification tag 200 from the associated received e-mail to the outbound e-mail.

Modifications, additions, or omissions may be made to the method depicted in FIG. 5. The method may include more, fewer, or other steps. For example, e-mail classification module 30 may update classification information 38 to reflect that an e-mail was sent. While discussed as e-mail classification module 30 performing the steps, any suitable component of system 10 may perform one or more steps of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system, comprising:
a network interface configured to:
receive an electronic mail; and
receive data from an email classification database; and a processor communicatively coupled to the network interface and configured to:
determine that the received electronic mail comprises a classification tag comprising classification information appended to a case number, wherein:
the classification information comprises a classification type identifying the email classification database associated with the classification tag; and
the case number references additional classification information stored in the email classification database, wherein the case number comprises:
a classifier identifying a user that classified the electronic mail, and
a timestamp identifying when the electronic mail was classified; and
parse the classification tag to extract at least a portion of the classification information in response to the determination;
the network interface further configured to receive a change in the classification information; and
the processor further configured to:
create a new classification tag comprising the changed classification information and the case number;
append the new classification tag to the received electronic mail to generate a tagged received electronic email;
create an outbound electronic mail associated with the received electronic mail; and
append the new classification tag to the outbound electronic mail.

2. A system, comprising:
a network interface operable to:
receive an electronic mail from a first computer; and
receive data from an email classification database; and
a processor communicatively coupled to the network interface and configured to:
determine that the received electronic mail comprises a classification tag comprising classification information appended to a case number, wherein:
the classification information comprises a classification type identifying the email classification database associated with the classification tag; and
the case number references additional classification stored in the email classification database, wherein the case number comprises:
a classifier identifying a user that classified the electronic mail, and
a timestamp identifying when the electronic mail was classified; and
parse the classification tag to extract at least a portion of the classification information in response to the determination;
display the at least a portion of the classification information on the first computer; and
wherein the network interface is further configured to receive a change in the classification information associated with the received electronic mail from the first computer; and the processor is further configured to:
create a new classification tag comprising the changed classification information and the case number; and
append the new classification tag to the received electronic mail to generate a tagged received electronic email.

3. The system of claim 2, wherein the processor is further operable to:
create an outbound electronic mail associated with the received electronic mail; and append the classification tag of the received electronic mail to the outbound electronic mail to generate a tagged outbound electronic email.

4. The system of claim 3, wherein appending the classification tag to the outbound electronic mail comprises appending the classification tag to the body of the outbound electronic mail.

5. The system of claim 2, wherein: the processor is further configured to:
receive a request from a second computer for an electronic mail report, the request comprising requested classification information;
associate the requested classification information to classification information; and
generate the electronic mail report, the electronic mail report comprising relevant electronic mails, wherein relevant electronic mails are electronic mails associated with the requested classification information; and
the network interface is further configured to communicate the electronic mail report to the second computer.

6. The system of claim 2, wherein the processor is further configured to: determine an actionable event from the classification information associated with the received electronic mail; and
execute the actionable event.

7. A non-transitory computer readable medium comprising logic, the logic, when executed by a processor, configured to:
receive an electronic mail on a first computer;
determine that the received electronic mail comprises a classification tag comprising classification information appended to a case number, wherein:

the classification information comprises a classification type identifying the email classification database associated with the classification tag; and the case number references additional information stored in an email classification database, wherein the case number comprises:

a classifier identifying a user that classified the electronic mail, and a timestamp identifying when the electronic mail was classified;

parse the classification tag to extract at least a portion of the classification information in response to the determination;

display the at least a portion of the classification information on the first computer; and wherein the logic is further configured to:

receive a change in the classification information from the first computer;

create a new classification tag comprising the changed classification information and the case number; and append the new classification tag to the received electronic mail to generate a tagged received electronic mail.

8. The computer readable medium of claim 7, wherein the logic is further configured to:

create an outbound electronic mail associated with the received electronic mail; and append the classification tag of the received electronic mail to the outbound electronic mail to generate a tagged outbound electronic mail.

9. The computer readable medium of claim 8, wherein appending the classification tag to the outbound electronic mail comprises appending the classification tag to the body of the outbound electronic mail.

10. The computer readable medium of claim 7, wherein the logic is further operable to:

receive a request from a second computer for an electronic mail report, the request comprising requested classification information;

associate the requested classification information to classification information; generate the electronic mail report, the electronic mail report comprising relevant electronic mails, wherein relevant electronic mails are electronic mails associated with the requested classification information; and communicate the electronic mail report to the second computer.

11. The computer readable medium of claim 7, wherein the logic is further operable to:

determine an actionable event from the classification information associated with the received electronic mail; and execute the actionable event.

12. A method, comprising:

receiving an electronic mail on a first computer;

determining, by a processor, that the received electronic mail comprises a classification tag comprising classification information appended to a case number, wherein:

the classification information comprises a classification type identifying the email classification database associated with the classification tag; and the case number references additional classification information stored in an email classification database, wherein the case number comprises:

a classifier identifying a user that classified the electronic mail, and a timestamp identifying when the electronic mail was classified; and parsing, by the processor, the classification tag to extract at least a portion of the classification information;

displaying the at least a portion of the classification information on the first computer; and receiving a change in the classification information from the first computer; and creating a new classification tag comprising the changed classification information and the case number; and appending the new classification tag to the received electronic mail to generate a tagged received electronic mail.

13. The method of claim 12, further comprising: creating an outbound electronic mail associated with the received electronic mail; appending the classification tag of the received electronic mail to the outbound electronic mail to generate a tagged outbound electronic mail.

14. The method of claim 13, wherein appending the classification tag to the outbound electronic mail comprises appending the classification tag to the body of the outbound electronic mail.

15. The method of claim 12, further comprising:

receiving a request from a second computer for an electronic mail report, the request comprising requested classification information;

associating the requested classification information to classification information; generating the electronic mail report, the electronic mail report comprising relevant electronic mails, wherein relevant electronic mails are electronic mails associated with the requested classification information; and communicating the electronic mail report to the second computer.

16. The method of claim 12, further comprising:

determining an actionable event from the classification information associated with the received electronic mail; and executing the actionable event.

* * * * *